United States Patent
Döttling et al.

(10) Patent No.: US 7,688,798 B2
(45) Date of Patent: Mar. 30, 2010

(54) DATA TRANSMISSION METHOD

(75) Inventors: Martin Döttling, Neubiberg (DE); Jürgen Michel, München (DE); Bernhard Raaf, Neuried (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1011 days.

(21) Appl. No.: 10/545,659

(22) PCT Filed: Jan. 26, 2004

(86) PCT No.: PCT/EP2004/000626
§ 371 (c)(1), (2), (4) Date: Aug. 15, 2005

(87) PCT Pub. No.: WO2004/073245
PCT Pub. Date: Aug. 26, 2004

(65) Prior Publication Data
US 2006/0133402 A1    Jun. 22, 2006

(30) Foreign Application Priority Data
Feb. 14, 2003 (DE) .................. 103 06 288
Apr. 2, 2003 (DE) .................. 103 15 057

(51) Int. Cl.
*H04J 3/00* (2006.01)
(52) U.S. Cl. .................. 370/345; 370/278; 370/337; 370/465; 370/318
(58) Field of Classification Search .................. 370/464, 370/329, 330, 333, 346, 252, 278, 337, 345, 370/318, 465
See application file for complete search history.

(56) References Cited

U.S. PATENT DOCUMENTS

| 5,802,105 A | * | 9/1998 | Tiedemann et al. | ......... 375/225 |
| 6,389,066 B1 | | 5/2002 | Ejzak | |
| 6,442,151 B1 | * | 8/2002 | H'mimy et al. | ............. 370/333 |

(Continued)

FOREIGN PATENT DOCUMENTS

DE    101 18 100    4/2001

(Continued)

OTHER PUBLICATIONS

3rd Generation Partnership Project (3GPP); "Technical Specification Group Radio Access Network, Phyiscal layer procedures (FDD)"; 2002; TS 25.214 v5.3.0;pp. 8-63.*

*Primary Examiner*—Ricky Ngo
*Assistant Examiner*—Dewanda Samuel
(74) *Attorney, Agent, or Firm*—Laurence A. Greenberg; Werner H. Stemer; Ralph E. Locher

(57) ABSTRACT

The invention relates to a method for transmitting data between a transmitter and a receiver via a wireless data channel of a communication network (CN). The transmitter transmits data to the receiver, where the transmission includes at least one transmission parameter which is selected based on a first channel quality that is known to the transmitter. The receiver receives the data, and the receiver determines the first channel quality known to the transmitter from said data via the at least one used transmission parameter as well as a second, current channel quality via the quality of the received data; and the receiver compares the first channel quality with the second channel quality.

13 Claims, 3 Drawing Sheets

U.S. PATENT DOCUMENTS

| | | | |
|---|---|---|---|
| 6,510,148 B1 | 1/2003 | Honkasalo | |
| 6,542,538 B2 * | 4/2003 | Fischel et al. | 375/224 |
| 6,934,556 B2 * | 8/2005 | Takano | 455/522 |
| 7,046,678 B2 * | 5/2006 | Jiang et al. | 370/395.41 |
| 7,103,325 B1 * | 9/2006 | Jia et al. | 455/101 |
| 7,123,590 B2 * | 10/2006 | Mir et al. | 370/252 |
| 7,130,639 B2 * | 10/2006 | Lee et al. | 455/452.2 |
| 7,197,021 B2 * | 3/2007 | Seo et al. | 370/335 |
| 7,408,904 B2 * | 8/2008 | Terry | 370/337 |
| 2002/0168944 A1 * | 11/2002 | Terry et al. | 455/67.1 |
| 2003/0036403 A1 * | 2/2003 | Shiu et al. | 455/522 |
| 2003/0074476 A1 * | 4/2003 | Kim et al. | 709/246 |
| 2003/0100267 A1 * | 5/2003 | Itoh et al. | 455/69 |
| 2003/0210668 A1 * | 11/2003 | Malladi et al. | 370/335 |
| 2003/0228876 A1 * | 12/2003 | Hwang | 455/522 |
| 2004/0005903 A1 * | 1/2004 | Dick et al. | 455/513 |
| 2004/0110473 A1 * | 6/2004 | Rudolf et al. | 455/69 |
| 2005/0220040 A1 * | 10/2005 | Petrovic et al. | 370/278 |

FOREIGN PATENT DOCUMENTS

| | | |
|---|---|---|
| EP | 0 903 883 | 3/1999 |
| EP | 1248485 A1 * | 10/2002 |
| WO | WO 00/59129 | 10/2000 |
| WO | WO0070897 | 11/2000 |
| WO | WO02093784 | 11/2002 |
| WO | WO03003657 | 1/2003 |

* cited by examiner

FIG 3

| CQI-VALUE | Transport-Block-Size | Number HS-PDSCH | Modulation | Reference Adjustment | $N_{IR}$ | $X_{RV}$ |
|---|---|---|---|---|---|---|
| 0 | N/A | \multicolumn{4}{c|}{Out of Range} | | |
| 1 | 137 | 1 | QPSK | 0 | 9600 | 0 |
| 2 | 173 | 1 | QPSK | 0 | | |
| 3 | 233 | 1 | QPSK | 0 | | |
| 4 | 317 | 1 | QPSK | 0 | | |
| 5 | 377 | 1 | QPSK | 0 | | |
| 6 | 461 | 1 | QPSK | 0 | | |
| 7 | 650 | 2 | QPSK | 0 | | |
| 8 | 792 | 2 | QPSK | 0 | | |
| 9 | 931 | 2 | QPSK | 0 | | |
| 10 | 1262 | 3 | QPSK | 0 | | |
| 11 | 1483 | 3 | QPSK | 0 | | |
| 12 | 1742 | 3 | QPSK | 0 | | |
| 13 | 2279 | 4 | QPSK | 0 | | |
| 14 | 2583 | 4 | QPSK | 0 | | |
| 15 | 3319 | 5 | QPSK | 0 | | |
| 16 | 3565 | 5 | 16-QAM | 0 | | |
| 17 | 4189 | 5 | 16-QAM | 0 | | |
| 18 | 4664 | 5 | 16-QAM | 0 | | |
| 19 | 5287 | 5 | 16-QAM | 0 | | |
| 20 | 5887 | 5 | 16-QAM | 0 | | |
| 21 | 6554 | 5 | 16-QAM | 0 | | |
| 22 | 7168 | 5 | 16-QAM | 0 | | |
| 23 | 7168 | 5 | 16-QAM | -1 | | |
| 24 | 7168 | 5 | 16-QAM | -2 | | |
| 25 | 7168 | 5 | 16-QAM | -3 | | |
| 26 | 7168 | 5 | 16-QAM | -4 | | |
| 27 | 7168 | 5 | 16-QAM | -5 | | |
| 28 | 7168 | 5 | 16-QAM | -6 | | |
| 29 | 7168 | 5 | 16-QAM | -7 | | |
| 30 | 7168 | 5 | 16-QAM | -8 | | |

DATA TRANSMISSION METHOD

FIELD OF TECHNOLOGY

The present disclosure relates to a method for transmitting data between a transmitter and a receiver via a radio data channel, in which data transmission parameters are adjusted as a function of the quality of the radio data channel.

BACKGROUND

When data is transmitted from a transmitter to a receiver, it is important for the data to reach the receiver with a satisfactory level of quality and also for the data transmission to take up as few resources as possible.

The data is coded to make it less sensitive to errors on the transmission path. With wireless communication networks, the transmitter can also adapt its transmit power to transmission conditions.

In order to be able to code appropriately for the current transmission, the transmitter must know the receive quality at the receiver. The modulation system and code rate can both be adapted in the context of adaptive coding. For mobile communication networks this is also referred to as adaptive modulation and coding (AMC). The modulation system refers to the manner in which the carrier is modified as a function of the signal carrying the information. In mobile radio for example the QPSK (quadrature phase shift keying) modulation system or 16 bit QAM (quadrature amplitude modulation) is used. The code rates indicate how many kilobits for example are transmitted per second (Kbps).

The modulation system is often extended into a modulation and coding system MCS, in which the code rate is indicated as well as the modulation system.

This is considered in more detail below with reference to an example from a specific communication network, a UMTS mobile radio system, for which the following terms are introduced:

Terms Used

A communication system or communication network is a structure for the exchange of data. It can be a cellular mobile radio network, such as the GSM (global system of communications) network or the UMTS (universal mobile telecommunications system) network. Terminals and base stations are generally provided in a communication system. In UMTS, the communication system or radio transmission network has at least base stations, also referred to here as nodes, as well as radio network controllers (RNC) to connect the individual base stations. The terrestrial radio access network, or universal terrestrial radio access network UTRAN, is the radio element of a UMTS network, in which a radio interface is also provided. A radio interface is standardized and defines all the physical and protocol-related specifications for the data exchange, for example the modulation method, the bandwidth, the frequency swing, access methods, safeguarding procedures and even switching methods. UTRAN therefore comprises at least base stations and at least one RNC.

In the case of cellular mobile radio systems, different radio transmission technologies can be provided, which define how the physical connection resources are organized. In the case of UMTS, a frequency division duplex (FDD) mode is currently provided as well as various time division duplex (TDD) modes. Using FDD mode, data is transmitted from so-called uplink and downlink connections on different frequencies by frequency multiplex, while with TDD modes data is transmitted from uplink and downlink connections on the same frequency by time multiplex.

A base station is a central unit in a communication network, which, in the case of a cellular mobile radio network, controls communication terminals within a cell of the mobile radio network via one or more radio channels. The base station provides the air interface between base station and terminal, and it is responsible for radio operation with the mobile subscribers and monitors the physical radio connection. It also transmits useful and status messages to the terminals. The base station has no switching function just a service function. A base station has at least one transmit/receive unit.

A terminal can be any communication terminal, through which a user communicates in a communication system. It can for example be a mobile radio terminal or a portable computer with a radio module. A terminal is often also referred to as a mobile station (MS) or in UMTS user equipment (UE).

In mobile radio, a distinction is made between two connection directions. The downlink (DL) refers to the transmission direction from the base station to the terminal. The uplink (UL) refers to the counter transmission direction from the terminal to the base station.

In broadband transmission systems, e.g. a UMTS mobile radio network, a channel is a sub-area of the overall transmission capacity available. In the context of this application a wireless communication path is referred to as a radio channel.

In a mobile radio system, e.g. UMTS, there are two types of physical channel for data transmission: permanently assigned or dedicated channels and shared-used or common channels. In the case of dedicated channels, a physical resource is reserved solely for the transmission of information for a specific terminal. In the case of common channels information can be transmitted, which is intended for all terminals, for example the primary common control physical channel (P-CCPCH) in the downlink, or all the terminals share a physical resource, with each terminal only being able to use it for a short time. This is the case for example with the physical random access channel (PRACH) in the uplink.

During transmission via a common or dedicated channel, the data undergoes both bandwidth spreading by means of a spread code or channelization code for more reliable transmission and also a scrambling procedure to identify a specific connection. Different types of scrambling code are used for this purpose as a function of the transmission direction, channel type and radio transmission technology.

While a bit from a data sequence is generally referred to as a symbol, a bit from a bandwidth-spread sequence is referred to as a chip.

In mobile radio systems such as UMTS packet switched services, by means of which data is transported in packets, are provided as well as circuit switched services.

The so-called high-speed downlink shared channel (HSD-SCH), to which a corresponding control channel, for example the shared control channel for HS-DSCH (HS-SCCH), is assigned represents an extension of the existing downlink-shared channel (DSCH).

Determination of Channel Quality in the Case of the HSDPA in UMTS

Until now, to allow the transmitter (e.g. the base station) to know the channel quality at the data receiver, a message or channel test message was sent to the data transmitter, which the transmitter could use to estimate the channel quality with which data is received at the receiver. In the case of a downlink data transmission for the HSDPA in the UMTS system, this takes place as follows: the mobile station sends a standardized message or CQI (channel quality indicator) message to the base station. This CQI message contains information about the channel quality tested by the receiver in a predefined, standardized form. The base station can use this to determine the channel quality with which data is received at the receiver. The base station selects data transmission parameters for the transmission of data to the mobile station based on the channel quality determined. These data transmission parameters could for example be the modulation system, the coding rate or the transmit power.

However, channel quality can change over time. Therefore until now a CQI message was sent at regular intervals from the mobile station to the base station, so that the channel quality could be repeatedly determined and notification thereof given.

In summary, transmission of the CQI message resolves the problem of channel quality having to be known in the transmitter. However the CQI message also has to be transmitted and therefore takes up resources in the uplink, i.e. in transmission from the mobile station to the base station. To keep these aforementioned resource burden as low as possible, and also to obtain channel information with adequate accuracy, the following steps have been taken:

1) The CQI message is not transmitted in every frame, i.e. with maximum possible frequency, but only once in k frames, the mobile station being informed of k by the base station. For example transmission characteristics do not change very quickly at low speed and a lower CQI message transmission rate is adequate. However a higher transmission rate (i.e. smaller k) is required when mobile stations are moving quickly, with the channel changing very significantly over time.

2) If a CQI message is transmitted when data decoding has failed in the receiver. The base station is notified of this with a so-called NACK (Negative ACKnowledge) message. Further to this NACK, according to this proposal the mobile station should send a CQI, on the basis of which the base station can make a better adjustment in the future.

However this method only resolves the problem to an unsatisfactory degree, as shown below:

If the transmission quality is too good rather than too poor, all messages are typically received correctly and no NACKs are transmitted only ACKs (Positive ACKnowledge or positive confirmation). However, transmission with too good of a quality is also sub-optimal, as it needlessly takes up resources (in particular base station transmit power or additional interference in all other mobile stations), which are not really necessary and which could therefore be more usefully used for other connections.

The mode of operation of an ARQ method (in particular HARQ hybrid ARQ) is also not optimal, if all or almost all packets are received correctly straight away but decoding fails in 10-30% of cases. In such cases retransmission must be requested, which means an increased resource outlay, but on the other hand transmission can take place at a significantly lower power, if it only has to be correctly decoded with a probability of 70 to 90%, than if a higher decoding value were required. Energy and resources are therefore generally saved.

However this arrangement means that even with optimum adjustment a CQI message is still transmitted in 10 to 30% of cases, even if it is not necessary, because the adjustment is already optimal and therefore does not have to be changed.

According to a further proposal the current channel status is not transmitted, at least at high speeds, but the history averaged over several frames. The reason for this is the fact that the channel characteristics due to fast fading change so quickly at high speeds that the information about them is already out of date when it arrives at the base station. The general position of a mobile station and the additional channel attenuation produced by shadowing and diffraction phenomena at large structures, so-called log-normal fading, however change much more slowly and are less quickly out of date. Averaging eliminates the fluctuations due to fast fading and allows a more accurate mean value to be determined. This method does not resolve any problems relating to optimum fast transmission per se but it at least improves knowledge of the mean transmission quality.

BRIEF SUMMARY

In light of the above, the present disclosure provides illustrations of a method and a device, which ensures transmission with transmission parameters that are adapted to the transmission conditions, and at the same time requires as little additional free transmit capacity as possible.

Under the exemplary embodiments discussed below, the data receiver sends an additional channel test message to the data transmitter, when the receiver determines that the transmission parameters currently being used are not adapted to the transmission conditions, i.e. are too good or too poor for example.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 3 illustrates an extract from a CQI mapping table.

DETAILED DESCRIPTION

It is understood that, even though reference is made below to examples relating to an HSDPA transmission, the invention in its diverse embodiments is not only applicable to packet-switched or packet-oriented transmission or channels but also to continuous or circuit-switched transmission. Similarly, no restriction is required to the downlink direction but it is possible to transmit in a similar fashion in an uplink direction, whereby it is possible to take into account the fact that unlike the base station the mobile station is not authorized to distribute resources in the cell.

Figure 1:
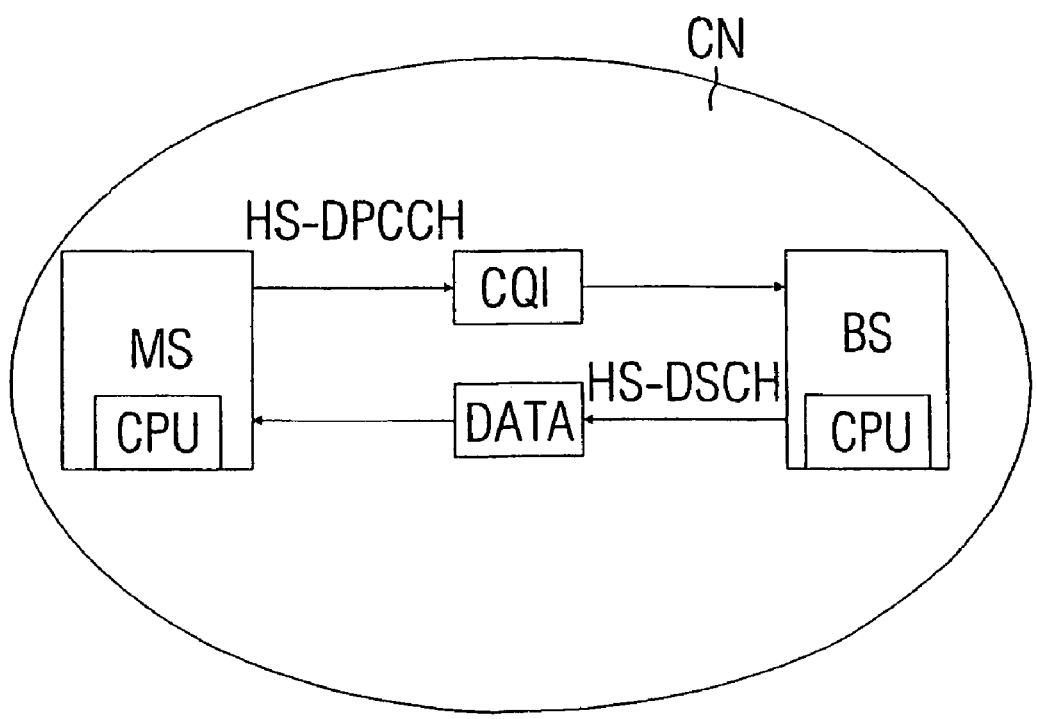
FIG. 1 is a schematic diagram of the communication between a mobile station and a base station in a communication network, in which the transmission parameters are adapted to the transmission conditions under an exemplary embodiment.

In FIG. 1, the mobile station MS sends the base station BS a message to transmit the channel test CQI via the HSDPA uplink control channel or dedicated physical control channel (uplink) for HS-DSCH HS-DPCCH. The mobile station tests this channel quality based on receipt of a pilot channel and signals this in the CQI message. In UMTS the pilot channel used can be the primary common control physical channel (PCCPC) or a secondary common control physical channel (SCCPC). This channel test message CQI is standardized so that the base station BS knows the channel quality present at the mobile station. (In UMTS the primary common control physical channel PCCPC or a secondary common control physical channel SCCPC can be used for this). When determining channel quality, it is assumed that the output of the HSDPA data channel HS-DSCH is in a predefined ratio to the output of the pilot channel, but in some instances the base station can take deviations from this into account. Based on the notified channel quality the base station adjusts the data transmission parameters, with which data is transmitted from the base station BS to the mobile station MS via the HSDPA data channel HS-DSCH. These transmission parameters can, for example, be modulation and coding system, the coding rate, the transmit power of the base station, etc. The mobile station receives the data transmitted in packets from the base station.

The mobile station MS can now determine in various ways which transmission parameters were used.

a) In UMTS-HSDPA, the information about the transmission parameters relating to the modulation and coding system MCS is transmitted before the packet. This takes place on the HS-SCCH, which is sent parallel to and temporally slightly before the HS-DSCH that carries the data.

b) The transmitted output is not transmitted in this fashion to the mobile station MS. The mobile station MS cannot therefore determine an absolute value for the transmit power, as is possible for example when transmitting CQI messages via the HSDPA pilot channel but can only establish a relative value, by which the transmission is too good or too poor.

Figure 2:
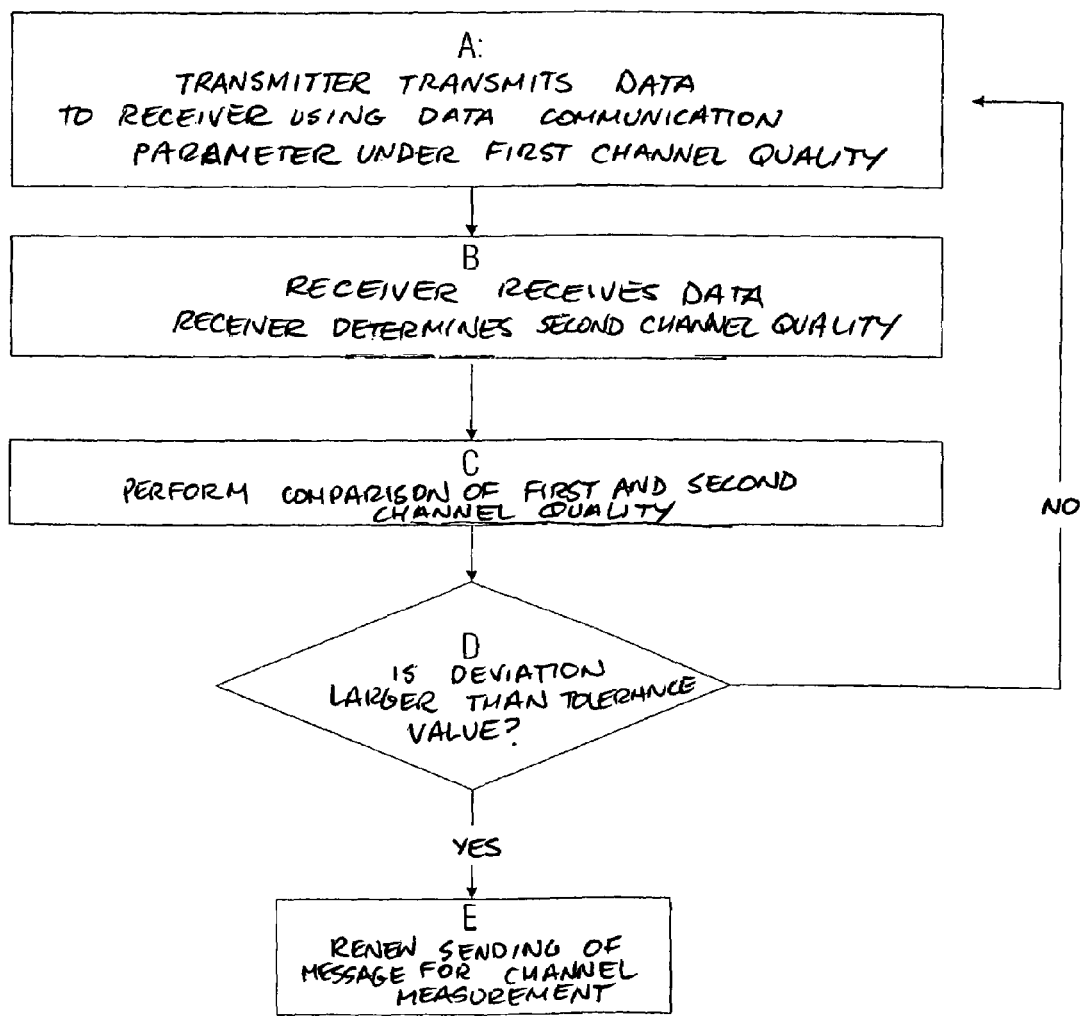
FIG. 2 is a flow diagram of the sequence of channel parameter adjustment.

FIG. 2 shows the sequence of transmission parameter adjustment again in schematic form.

The link between transmit power, channel quality and other transmission parameters is as follows:

The modulation and coding system MCS can, for example, be converted to the difference between the observed signal to noise ratio SNR and the SNR required to receive the MCS with a defined block error rate, e.g. 10%, expressed in decibels (dB). A value of 2 dB is assigned to a modulation and coding system MCS that would also have functioned with two decibels less output. Functioned here means that block error rate did not exceed 10% for example.

In the case of HSDPA, the number of the modulation and coding system MCS is used as the unit instead. FIG. 3 shows a portion of a list of various modulation and coding systems with different levels of reliability in respect of transmission error. The index in this list could also be used instead of expressing the difference in the unit dB. In this case 2 would mean that a modulation and coding system that is two units more reliable should be used. If the current transmission is currently carried out with a modulation and coding system MCS from this list, this means that the MCS that is more reliable by two positions should be used instead. If a modulation and coding system from the list is not currently being used, the currently used modulation and coding system MCS must first be converted to another, equivalent modulation and coding system MCS and the difference must then be established in respect of the equivalent modulation and coding system MCS.

Apart from signaling at least some of the transmission parameters, it is also possible for the mobile station MS to decode the received data packet and arrive at the probable original data content or useful data content via a series of probability decisions. It can then determine which coded representation this useful data content would ideally have had and thus establish the extent to which non-ideal channel quality has modified the data packet during transmission. An error rate, for example a block error rate, can then be determined from this.

It can be determined from the communication system, the base station or the mobile station which error rates are acceptable for a transmission.

If the error rate determined by the mobile station MS exceeds a specific, predefined tolerance value, the mobile station MS transmits a repeat channel test via a channel test message CQI.

The above procedure may be advantageous in the sense that transmission parameters are adapted in this fashion won't needlessly waste transmission resources with the unnecessary transmission of CQI messages. This output adjustment can be used for both too poor and too good transmission. Too good transmission is also not optimal in respect of resource utilization, as it takes up more resources, in particular transmit power of the base station or additional interference in all other mobile stations, which are not really necessary and could therefore be more usefully used for other connections. Also operation is not optimal, in particular in the case of a packet data transmission by means of an ARQ (automatic repeat request) method, in particular an HARQ (hybrid ARQ), if all or almost all packets are received correctly straight away. Operation is optimal in respect of resources, when decoding fails in approx. 10-30% of cases. It is true that in such cases retransmission must be requested, which means a correspondingly higher resource outlay and an increased delay but on the other hand transmission can take place with significantly less power, if it only has to be decoded correctly with a probability of 70-90% compared with when a higher decoding rate is required. Therefore resources are generally saved.

A further advantage is that the channel quality of the data channel is taken into account. The quality of the data channel can differ from the quality of the pilot channel for example in that both are scrambled with different scrambling codes, namely the so-called primary or a secondary scrambling code. A scrambling code serves to spread the bandwidth of the signal. As signals scrambled with different scrambling codes interfere with each other differently, in particular signals scrambled with the same scrambling code interfere with each other less than signals scrambled with different scrambling codes, it may be that the pilot channel is subject to more or less interference from other transmissions than the data channel. In this instance a test on the data channel is more accurate than a test on the pilot channel. In UMTS emission via the base station often takes place using a so-called transmit diversity method, in which data is emitted via a number of antennae. The mobile station MS tries to take this into account when calculating quality but as emission is influenced by various parameters, it is not ensured that the estimation of the quality of the data channel from the pilot channel always provides precise or even merely satisfactory results.

Under an exemplary embodiment, the base station is informed of the quality of the connection by the channel quality determination message CQI or the associated feedback.

A modulation and coding system is used based on a channel quality message CQI, as the code rate can be calculated from the number of codes and the size of the transport block.

Based on this information and further criteria, the base station determines the so-called transport format (TF) used in the downlink. The transport format TF determines the content of a packet significantly more precisely, namely with bit accuracy, and the transmission resources used for it. To this end the transport format TF includes the following information:

The number and identification numbers of the channelization codes used (channelization codes are used to separate individual services or users);
The type of modulation;
The size of the transport block;

The redundancy and constellation version, which defines precisely which bits are transmitted where in the packet;

Additional control information is also transmitted, which does not serve primarily to define the transport format but is necessary for correct processing of a packet;

The identification number of the hybrid IQ process, which serves in the case of multiple transmissions of a packet to overlay these correctly, for example for decoding; and A so-called new data indicator, which helps to distinguish transmission of a new packet from re-transmission(s) of a previous packet.

Further advantageous embodiments are described below with reference to individual features of the invention or its developments.

1. Tolerance Value

Details of the tolerance and deviation in signaling steps of the CQI feedback, corresponding to approximately one dB steps. The tolerance here indicates the maximum permitted deviation in receive quality which can be present without a CQI transmission being initiated.

Regarding details of different tolerance values for too high/low quality, a mobile station can be specifically assigned a high/low quality of service and the mobile station only sends a new CQI if the current value is above/below these individual thresholds.

The tolerance value, which indicates a maximum deviation between the channel quality determined and the channel quality required for the MCS used, can be specified in decibels, as outlined above. This expresses the degree to which it is necessary to operate with a higher or lower output or by how many decibels more or less reliable the modulation and coding system used should be. This tolerance value can be set by the mobile station, which distinguishes between services with a low or high quality of service. In this instance the mobile station only sends a new channel test message CQI, if the current values are above or below these individual thresholds it has set. Corresponding allocation of channel quality can of course also take place on the part of the base station.

2. Adjusting the Quality of Service

A data packet sent deliberately with too good or too poor quality, i.e. with better or worse quality than is required to achieve the block error rate set, can also be specifically identified (this requires one bit of signaling information). The mobile station can then ignore such data packets and not send a CQI.

3. Modification of Transport Format

Conversion of the currently used TF to the nearest TF that can be signaled in the CQI feedback then comparison to determine whether it is within the tolerance. During conversion the TF is calculated, the transmitted energy per useful data bit of which is closest to the transmitted energy per useful data bit of a TF that can be signaled. With reference to the table shown in FIG. 3, this means that it is possible to proceed in the table even with indices that are not whole numbers, i.e. for example from index 1 to index 5.7.

The table shows an index referred to as a CQI value. The second column shows the transport block sizes, i.e. how many bits there are in a transport block. The next column shows how many physical high-speed downlink channels HS-PDSCH are assigned to a transmission. The fourth column shows the modulation system and the fifth column the reference output adjustment.

4. Adjustment of Transmit Time for an Additional Channel Test Message

At the end of a data request or packet call, only a comparatively small number of bits may remain to be sent to the mobile station with the last transmission. With this last transmission it may no longer be possible to adjust the size, or more precisely the number of useful bytes, in an optimum fashion to transmission conditions. (However the output can still be adjusted). It can therefore happen that the comparatively few remaining bits are transmitted with too much energy and therefore too good a level of receive quality. This would result in the mobile station sending a CQI, which is however superfluous, as the too good quality level was not adjusted due to incorrect information about channel characteristics. This can be prevented by specifying that no CQI message is sent based on a too good transmission below a certain number of useful bits. A CQI message can be sent if transmission is too poor but it can also be specified that no CQI message is sent even then, as the packet call is almost finished and optimization is (almost) no longer worth it.

An additional CQI may also only be sent on first transmission of a data packet not on retransmission, as retransmissions can generally be sent with less energy than first transmissions. In the case of retransmissions it is possible to combine all transmissions to that point so that all the energy is available, not just the energy of the last re-transmission.

The additional CQI messages are also not sent in every (possible) TTI (transmission time interval) but only in a predefined interval, which is expediently shorter than the interval k in which the regular CQI is sent. This has the following advantages:

The transmission delay and use of the newly transmitted CQI mean that this new CQI are not used for the next frame but typically only after 7 or more frames (so-called round trip delay or response delay). The base station can therefore only respond to the transmitted CQI after 7 frames, so it is therefore not expedient to remind it again before this that the setting was incorrect. It is only expedient to transmit a new CQI if the setting has still not been modified after 7 frames, as the "first" then appears not to have been transmitted correctly.

5. Aspects Relating to the Base Station

The problem exists in respect of the base station that the base station must determine whether or not a CQI message was transmitted in a defined frame. Different methods are available for this, which by their nature however cannot be perfect (output measurement, evaluation of the decoding metric after decoding). If it is known beforehand that the additional CQIs can only occur in a certain interval, the base station only has to attempt decoding in this interval; saving computing outlay in the base station. Also a CQI message can be detected incorrectly less frequently, when no CQI message was actually sent, as there is less opportunity for such errors.

The problem with the end of the data request or end of packet call described further above can also thus be alleviated. Too high quality can only be flagged by such a CQI message if such a last data packet is sent at a time when an additional CQI message is sent or can be sent. If it is sent at another time, the mobile station can identify that there are no further packets following and it is therefore an end of packet call situation and will therefore not send a CQI message.

The base station can also preferably send such last data packets at times when the mobile station does not respond with a CQI message.

6. Coding the Channel Quality Determination Messages CQI

Regular CQI messages are typically coded absolutely with a 5-bit resolution, i.e. 32 different reports are possible (only 31 of these are actually used, one coding is used for other purposes). Irregular CQIs can however be coded differentially, so they contain just a deviation in respect of the last reference value, e.g. the last CQI. The total dynamic of 32 values is typically not needed for this, fewer values are sufficient. As it is then necessary to code fewer than 5 bits, the coding can also be organized more reliably.

One option for more reliable coding would be to use a different code from the one for 5 bits. A further preferred option is to calculate a 2-bit checksum from the for example 3 bits to be transmitted, said checksum then being transmitted with the 3 useful bits. The number of bits thereby remains constant at 5 bits and the same coding and decoding algorithms can be used. The checksum can then be used on receipt in the base station, to improve the reliability of the DTX detection (DTX: discontinuous transmission).

The checksum can be calculated according to any known method. Optimized calculation of the checksum would be such that the coding characteristics of the overall code resulting from the calculation of the appended checksum and the conventional code are optimized. For example the distance spectrum or the minimal distance of the overall code can be optimized.

The reference for the differential coding can be selected in different ways:

- It can be the last regularly transmitted CQI value. This has the advantage that overlooked irregular CQI messages do not propagate errors.
- It can be the last transmitted CQI value—regular or irregular. This has the advantage that a more current value is used, so the deviations to be coded differentially are smaller.
- It can be the value of the currently transmitted TF. This has the advantage that it is an absolute reference, with which errors cannot be propagated. The principle is then similar to the power control implementation by power-up and power-down commands.

A refinement of the differential coding: If the mobile station selects the largest or smallest CQI value possible, i.e. the first or last value from the table, the differential coding transmitted is not the actual difference between the current value and this extreme value but the maximum difference in the direction of the extreme value. The base station for its part limits the new value calculated from the received differential value to the extreme value. This ensures that the base station can determine the extreme value correctly, even if it has previously implemented an incorrect coding and has therefore assumed a slightly incorrect CQI value.

The options −4 dB, −2 dB, +2 dB, +4 dB can be provided as options for the value range for the differential coding, i.e. a 2 dB step. The 0 dB option does not need to be coded, as in this instance an additional CQI is simply not sent. An alternative step would be −6 dB, −2 dB, +2 dB, +6 dB; or even −8 dB, −2 dB, +2 dB, +8 dB. With this step it would be possible on the one hand to signal small changes (2 dB) and also large changes (8 dB). In the event of a 4 dB change, it would be necessary to send two messages one after the other, each with +2 dB. In the event of a 6 dB change, either three messages each with +2 dB could be sent or +8 dB followed by −2 dB. This progressive discretization allows the required value to be adjusted more quickly. The differential coding should be better for large deviations such as +/−8 dB than for small +/−2 dB.

Deviation discretization can also be made as a function of the tolerance. A rougher discretization should therefore implicitly be used with a large tolerance and a more refined discretization with a small tolerance. The discretization to be used does not have to be signaled but is implicitly defined by the tolerance signaling.

7. Alternatives to the Generation of Messages for Channel Quality Determination CQI As an alternative to the proposed generation of CQI messages, the following method can also be used to estimate channel characteristics:

If a lot of NACKs are received, this indicates a poor channel so the coding can or should be adjusted accordingly, as if a CQI message had been sent informing of a deterioration. Similarly, if only a few NACKs are received, this indicates too good a setting and the coding should be selected to be less reliable or the transmit power should be reduced. There are a lot of options for how many NACKs or how few NACKs should be implemented specifically. For example a sliding mean value can be created or a variable, which is incremented/decremented by predefined values in the event of a NACK/ACK and is also multiplied by a factor between 0 and 1 (oblivion factor). As an alternative to multiplication, the sum of the variable can also be reduced by a certain sum, either in every instance or only if an ACK/NACK has been sent. If this variable is below or above a certain value, the transmit quality is adjusted correspondingly. This method has the advantage that it requires no additional signaling in the uplink but modifications are generally implemented with a certain delay. A specific instance would be that the quality is adjusted after a fixed number of ACK/NACKs, the fixed number having to either be in direct succession or be counted in total since the last adjustment (or as the difference between ACK and NACK).

As an alternate embodiment, it can also be specified that a mobile station should send a CQI message in each instance after a certain number of NACKs or ACKs. This avoids unnecessary CQI messages after each NACK. The method can also be combined with the method proposed in the example 14, i.e. sending a CQI message when the above-mentioned variable is above or below a value.

The current channel characteristics are transmitted as standard with the CQI. It is also possible to transmit the appropriately averaged channel characteristics. The exemplary embodiments described herein can be applied equally for both methods. When combined with the Phillips method (notification not of the current channel qualities to take into account fast fading but of averaged channel quality to improve determination of log-normal fading), an additional CQI message is sent for example, if the currently averaged transmission quality is different from the last signaled transmission quality.

All exemplary embodiments can also be combined, i.e. a CQI message is sent more frequently when a data transmission is active and less often when no data is being received. This prevents unnecessary CQI messages being sent, when no data is pending.

All methods, in particular the above exemplary embodiment, can advantageously be combined with a method, in which a specific CQI message is requested by the base station before new data is sent after a transmission gap.

8. Tests on the Data or Pilot Channel

The mobile station cannot carry out tests on the data channel in times when no data is being sent to the mobile station. Therefore in one exemplary embodiment in such cases the mobile station tests the quality on the pilot channel, with the quality on the data channel being tested if data is being transmitted.

The following embodiment options exist when the quality is tested on the data channel: Either the signal to noise ratio SNR can be measured directly (by measuring the signal strength and noise strength). The CQI can then be calculated from the SNR and the known data processing capacity of the mobile station. Alternatively the received data can also be decoded and then recoded, so that the raw bit error rate can be calculated from the comparison of the originally received bits and the re-encoded bits and the CQI message from that.

Accordingly, the embodiments described above include a method for adjusting at least one transmission parameter, which determines at least one characteristic of data to be transmitted between a mobile station and a base station,
  in which the mobile station sends a channel test message to the base station,
  in which the base station determines the channel quality on the basis of this channel test message,
  in which the at least one data transmission parameter is adjusted as a function of a previously determined channel quality of the data channel and
  a transmitter is informed of this determined channel quality by means of a channel test message for the purposes of sending data via the data channel, in which
  the channel quality is tested with direct use of the data channel,
  the channel test message is sent to the transmitter when the deviation between the currently measured channel quality and the previously notified channel quality is greater than a predefined threshold.

A number of elements are contained that improve the channel quality report (CQI) individually per se and in particular also in combination with each other:

An additional CQI may also be sent, when the mobile station determines that the currently used transmission is not optimal, i.e. when the current coding/output either results in too good receive quality on the part of the mobile station or a too poor quality. Unlike the prior art, the mobile station does not evaluate the receive quality of the pilot channel to this end and calculate an adequate transport format from this (assuming a predefined data/pilot channel output ratio), but it analyzes the current transport format and verifies whether it is adequate with the actual data output.

If the transport format (TF) is inadequate, i.e. it is transmitted either with too much or too little power, the mobile station sends a CQI.

The base station is then informed of the quality of the connection by the CQI feedback.

A modulation and coding system (MCS) is thus established by the feedback, as the code rate can be calculated from the number of codes and the size of the transport block.

Based on this information and further criteria, the base station determines the transport format (TF) used in the downlink. The TF determines the content of a packet significantly more precisely, namely to each bit, and the exact transmission resources used for this. To this end it contains the following information:
  The number and identification numbers of the channelization codes used,
  The type of modulation
  The size of the transport block
  The redundancy and constellation version (defines precisely which bits are transmitted where in the packet).

Additional control information is also transmitted from the base station to the UE, which does not serve primarily to define the transport format but is necessary for correct processing of a packet
  1. The identification number of the hybrid ARQ process (serves to overlay the multiple transmissions of a packet correctly),
  A new data indicator, which helps to distinguish transmission of a new packet from re-transmissions of a previous packet.

In the case where a CQI is not requested specifically, the standard absolute coding is not used, but a delta coding is used, which indicates the degree to which (by how many dB) the received output is too high or too low. This message can be signaled with only a few bits, e.g. 2 bits signifying the values −3 dB, −6 dB, +3 dB, +6 dB. One reason for this is that the deviation should be above the specified tolerance range but also cannot be too much greater as otherwise a CQI would have been sent earlier so that a very large deviation could not build up over time. This fact can be utilized such that the unused bits are used as a checksum, to improve identification of CQI messages by the base station. This is a DTX detection. The base station must decide whether a received signal actually contains a CQI or whether nothing but noise was received.

It is also possible to send additional or regular CQIs when a data transmission to the mobile station is active but to send the CQIs at a low rate only when there is no active data transmission, i.e. when the mobile station is only indirectly ready to receive data.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for transmitting data via a radio channel of a communication network between a transmitter and a receiver, the method comprising:
  determining at least one transmission parameter of the data transmitted to the receiver;
  determining a first channel quality, known to the transmitter, at the receiver, wherein the first channel quality is based at least in part on the at least one transmission parameter;
  determining a second channel quality from the first channel quality;
  comparing the first and second channel qualities in the receiver, wherein, if the first and second channel qualities differ from each other by more than a predefined tolerance value, the receiver informs the transmitter of a deviation by means of a channel test message, wherein the channel test message is sent in addition to further, regularly provided test messages;
  sending additional channel test messages in a time interval which is narrower than the time interval in which the regular channel test messages are sent;
  determining a further channel quality; and
  adjusting the at least one transmission parameter based on the further channel quality.

2. The A method for transmitting data via a radio channel of a communication network between a transmitter and a receiver, the method comprising:
  determining at least one transmission parameter of the data transmitted to the receiver;
  determining a first channel quality, known to the transmitter, at the receiver, wherein the first channel quality is based at least in part on the at least one transmission parameter;
  determining a second channel quality from the first channel quality;
  comparing the first and second channel qualities in the receiver, wherein, if the first and second channel qualities differ from each other by more than a predefined tolerance value, the receiver informs the transmitter of a deviation by means of a channel test message, wherein the channel test message is sent in addition to further, regularly provided test messages;

adapting the time interval for sending regular or non-regular channel test messages to the quantity of data transmitted;

determining a further channel quality; and adjusting the at least one transmission parameter based on the further channel quality.

3. A method for transmitting data via a radio channel of a communication network between a transmitter and a receiver, the method comprising:

determining at least one transmission parameter of the data transmitted to the receiver;

determining a first channel quality, known to the transmitter, at the receiver, wherein the first channel quality is based at least in part on the at least one transmission parameter;

determining a second channel quality from the first channel quality;

comparing the first and second channel qualities in the receiver, wherein, if the first and second channel qualities differ from each other by more than a predefined tolerance value, the receiver informs the transmitter of a deviation by means of a channel test message;

sending an additional channel test message when at least i data packets have been received one after the other outside a predefined tolerance range in respect of their error rate, i being an integer greater than one;

determining a further channel quality; and adjusting the at least one transmission parameter based on the further channel quality.

4. The method according to claim 3, wherein the regular channel test messages are coded absolutely with a predefined resolution and the additional channel test messages differentially in respect of a deviation from a reference value.

5. The method according to claim 4, wherein the last known first channel quality is used as the reference value.

6. The method according to claim 4, wherein the last known first channel quality determined on the basis of a regularly transmitted channel test measurement is used as the reference value.

7. The method according to claim 4, wherein the reference value comprises all the transmission characteristics of a data packet.

8. A method for transmitting data via a radio channel of a communication network between a transmitter and a receiver, the method comprising:

determining at least one transmission parameter of the data transmitted to the receiver;

determining a first channel quality, known to the transmitter, at the receiver, wherein the first channel quality is based at least in part on the at least one transmission parameter;

determining a second channel quality from the first channel quality;

comparing the first and second channel qualities in the receiver, wherein, if the first and second channel qualities differ from each other by more than a predefined tolerance value, the receiver informs the transmitter of a deviation by means of a channel test message, wherein the channel test message is sent in addition to further, regularly provided test messages;

coding the channel test messages with a fixed number m of bits, with (m-x) bits carrying information and a checksum of the (m-x) bits being created from the remaining x bits;

determining a further channel quality; and adjusting the at least one transmission parameter based on the further channel quality.

9. A method for transmitting data via a radio channel of a communication network between a transmitter and a receiver, the method comprising:

determining at least one transmission parameter of the data transmitted to the receiver;

determining a first channel quality, known to the transmitter, at the receiver, wherein the first channel quality is based at least in part on the at least one transmission parameter;

determining a second channel quality from the first channel quality;

comparing the first and second channel qualities in the receiver, wherein, if the first and second channel qualities differ from each other by more than a predefined tolerance value, the receiver informs the transmitter of a deviation by means of a channel test message, wherein the channel test message is coded differently in respect of the deviation from a maximum possible value for the deviation;

determining a further channel quality; and adjusting the at least one transmission parameter based on the further channel quality.

10. The method according to claim 9, wherein the step for a differential coding is predefined.

11. The method according to claim 10, wherein the differential coding step is a function of the tolerance value.

12. A method for transmitting data via a radio channel of a communication network between a transmitter and a receiver, the method comprising:

determining at least one transmission parameter of the data transmitted to the receiver;

determining a first channel quality on the basis of a pilot channel assigned to the radio data channel, the first channel quality known to the transmitter, at the receiver, wherein the first channel quality is based at least in part on the at least one transmission parameter;

determining a second channel quality from the first channel quality, wherein the second channel quality is determined on the basis of the pilot channel assigned to the radio data channel when no data is being transmitted;

comparing the first and second channel qualities in the receiver, wherein, if the first and second channel qualities differ from each other by more than a predefined tolerance value, the receiver informs the transmitter of a deviation;

determining a further channel quality; and adjusting the at least one transmission parameter based on the further channel quality.

13. A method for transmitting data via a packet-oriented radio channel of a communication network between a transmitter and a receiver, the method comprising:

determining at least one transmission parameter of the data transmitted to the receiver;

determining a first channel quality, known to the transmitter, at the receiver, wherein the first channel quality is based at least in part on the at least one transmission parameter;

determining a second channel quality from the first channel quality;

comparing the first and second channel qualities in the receiver, wherein, if the first and second channel qualities differ from each other by more than a predefined tolerance value, the receiver informs the transmitter of a deviation;
determining a further channel quality, on the basis of which the at least one transmission parameter is adjusted;
adjusting the at least one transmission parameters based on the at least one further channel quality;
organizing the data into at least one single data packet of a data packet group;
determining whether the second channel quality deviates from the first channel quality by more than the tolerance value; and
in response to the second channel quality deviating from the first channel quality by more than the predefined tolerance value, not sending a message to the transmitter of the last n data packets of the data packet group, n being an integer from one to the number of data packets within the data packet group.

* * * * *